(12) United States Patent
Choi et al.

(10) Patent No.: US 9,186,656 B2
(45) Date of Patent: Nov. 17, 2015

(54) CATALYST COMPOSITION FOR THE SYNTHESIS OF MULTI-WALLED CARBON NANOTUBES

(71) Applicants: Sang Kyu Choi, Daejeon (KR); Sang Hyo Ryu, Daejeon (KR); Ho Soo Hwang, Suwon-si (KR); Chung Heon Jeong, Daejeon (KR); Dong Hoon Oh, Daejeon (KR); Yeon Ja Lee, Daejeon (KR); Youngchan Jang, Daejeon (KR)

(72) Inventors: Sang Kyu Choi, Daejeon (KR); Sang Hyo Ryu, Daejeon (KR); Ho Soo Hwang, Suwon-si (KR); Chung Heon Jeong, Daejeon (KR); Dong Hoon Oh, Daejeon (KR); Yeon Ja Lee, Daejeon (KR); Youngchan Jang, Daejeon (KR)

(73) Assignee: KOREA KUMHO PETROCHEMICAL CO., LTD., Seoul (KR)

( * ) Notice: Subject to any disclaimer, the term of this patent is extended or adjusted under 35 U.S.C. 154(b) by 258 days.

(21) Appl. No.: 13/669,343

(22) Filed: Nov. 5, 2012

(65) Prior Publication Data

US 2014/0087184 A1    Mar. 27, 2014

(30) Foreign Application Priority Data

Sep. 25, 2012    (KR) .......................... 10-2012-0106439

(51) Int. Cl.

| | | |
|---|---|---|
| *B01J 23/00* | (2006.01) |
| *B01J 23/10* | (2006.01) |
| *B01J 23/883* | (2006.01) |
| *B01J 37/03* | (2006.01) |
| *B01J 37/08* | (2006.01) |
| *B01J 23/889* | (2006.01) |
| *B01J 23/881* | (2006.01) |
| *B01J 23/882* | (2006.01) |
| *B01J 23/885* | (2006.01) |
| *B01J 23/887* | (2006.01) |

(Continued)

(52) U.S. Cl.
CPC .............. *B01J 23/883* (2013.01); *B01J 23/881* (2013.01); *B01J 23/882* (2013.01); *B01J 23/885* (2013.01); *B01J 23/887* (2013.01); *B01J 23/8875* (2013.01); *B01J 23/8885* (2013.01); *B01J 23/8892* (2013.01); *B01J 23/8898* (2013.01); *B01J 35/002* (2013.01); *B01J 37/0054* (2013.01); *B01J 37/031* (2013.01); *B01J 37/082* (2013.01); *B82Y 30/00* (2013.01); *B82Y 40/00* (2013.01); *C01B 31/0233* (2013.01); *Y10T 428/2918* (2015.01)

(58) Field of Classification Search
USPC ......... 502/309, 310, 314–316, 318, 321–323; 977/752, 843; 428/367
See application file for complete search history.

(56) References Cited

U.S. PATENT DOCUMENTS 4,141,861 A * 2/1979 Courty et al. .................. 502/302
4,829,042 A * 5/1989 Cavalli et al. ................. 502/316

(Continued)

*Primary Examiner* — Cam N. Nguyen
(74) *Attorney, Agent, or Firm* — Kenyon & Kenyon LLP

(57) ABSTRACT

The present invention relates to a catalyst composition for the synthesis of multi-walled carbon nanotube having high apparent density in a manner of high yield. More particularly, this invention relates to a multi-component metal catalyst composition comprising i) main catalyst of Fe and Mo, ii) inactive support of Al and iii) optional co-catalyst at least one selected from Co, Ni, Ti, Mn, W, Sn or Cu. Further, the present invention affords multi-walled carbon nanotube having 5~15 nm of fibrous diameter and 0.5~4 μm bundle diameter.

5 Claims, 2 Drawing Sheets

(51) Int. Cl.
*B01J 23/888* (2006.01)
*B01J 35/00* (2006.01)
*B01J 37/00* (2006.01)
*B82Y 40/00* (2011.01)
*C01B 31/02* (2006.01)
*B82Y 30/00* (2011.01)

(56) References Cited

U.S. PATENT DOCUMENTS

| | | |
|---|---|---|
| 8,048,821 B2 * | 11/2011 | Ryu et al. .................. 502/324 |
| 8,673,807 B2 * | 3/2014 | Ryu et al. .................. 502/306 |
| 2003/0006019 A1 * | 1/2003 | Johnson et al. .................. 164/1 |
| 2011/0195013 A1 * | 8/2011 | Bae et al. .................. 423/447.3 |

* cited by examiner

CATALYST COMPOSITION FOR THE SYNTHESIS OF MULTI-WALLED CARBON NANOTUBES

BACKGROUND OF THE INVENTION

1. Field of the Invention

The present invention relates to a catalyst composition for the synthesis of multi-walled carbon nanotube having high apparent density in a manner of high yield. More particularly, this invention relates to a multi-component metal catalyst composition comprising i) main catalyst of Fe and Mo, ii) inactive support of Al and iii) optional co-catalyst at least one selected from Co, Ni, Ti, Mn, W, Sn or Cu. Further, the present invention affords multi-walled carbon nanotube having 5~15 nm of fibrous diameter and 0.5~4 μm bundle diameter.

2. Description of Prior Art

Carbon nanotube has a hexagonal honey comb shape in which one carbon atom is bonded with 3 adjacent carbon atoms. Further, the graphite plane is rolled in a round shape having nano size diameter. Specific physical properties are shown according to the size and shape of carbon nanotube. The weight of carbon nanotube is comparatively light due to its hollow structure. Further, the electrical conductivity is as good as that of copper, as well as the thermal conductivity is as good as that of diamond. Of course, the tensile strength is not less than that of iron. Carbon nonotube can be classified as single walled carbon nanotube, double walled carbon nanotube, multi-walled carbon nanotube and rope carbon nanotube depending on its rolled shape.

Such carbon nanotube can be generally manufactured by an arc-discharge method, a laser vaporization method, a plasma enhanced chemical vapor deposition method, a thermal chemical vapor deposition method, a vapor phase growth method, or an electrolysis method. Among them, a thermal chemical vapor deposition method has been preferably used, because the growth of carbon nanotube can be made by the direct reaction between carbon source gas and metal catalyst without using the substrate. Further, high purity of carbon nanotube can be economically manufactured in a large amount according to a thermal chemical vapor deposition method.

In a thermal chemical vapor deposition method, the metal catalyst is necessarily required. Among the metals, Ni, Co, or Fe has been commonly used. Each particle of metal catalysts can act as seed for the formation of carbon nanotube. Therefore, the metal catalyst has been required to be formed as nano size particle. Of course, many researches for developing metal catalyst have been tried.

As a metal catalyst preparation method developed up to now, the following preparation methods have been disclosed. First, it has been disclosed that the method comprises i) preparing the solution containing catalytic metals and support, ii) co-precipitating the catalyst composition by adjusting pH, temperature, and/or amount of ingredients, and iii) heat treating the precipitates under air or other gas atmosphere. Second, the method by drying or evaporating the suspension containing catalytic metal and fine grain support has been disclosed. Third, it has been disclosed that the method comprises i) ionizing the metal by mixing catalytic metal salt with cation particle support such as zeolite, and ii) reducing the ionized metal into metal particle by hydrogen or other reducing agent at high temperature. Fourth, the method by calcinating catalytic metal with solid oxide support material, such as, magnesia, alumina, and/or silica has been disclosed. Finally, the method of calcination for a metal composition has been disclosed where spray-drying of the catalytic metal precursor solution has been performed before calcination.

According to a catalytic chemical vapor deposition method, the metal catalytic components are slowly consumed in the process of synthesizing carbon nanotube. This consumption of metal catalytic components is caused by the inactivation of metal components by encapsulation, where carbon atoms encapsulate metal catalytic particles. Generally, re-activation of inactivated catalytic metal is neither possible, nor economical. In some cases, only few grams of carbon nanotube can be obtained using 1 gram of a metal catalyst composition including metal catalyst and support material. Therefore, the development of a highly active metal catalyst composition and of synthetic conditions has been required in order to produce the carbon nanotube in a commercially available scale Following technologies have been reported in patent disclosures or references until now.

According to U.S. Pat. No. 5,165,909 by Hyperion Catalysis International Inc., a method for producing carbon fibrils which comprises i) calcinating a catalyst composition at about 500° C. under air atmosphere after Fe catalyst is supported by $Al_2O_3$, ii) reducing the catalyst composition using hydrogen gas at about 900° C., and iii) preparing carbon fibrils by reacting benzene as a carbon source under hydrogen atmosphere at about 1,000° C. has been disclosed. However, the catalytic yield for preparing carbon fibril is not so good. Further, the process for preparing metal catalyst requires complicate steps of calcination and reduction as well as more than 800° C. of high reaction temperature.

To overcome such drawbacks of above patent disclosure, U.S. Pat. No. 6,696,387 disclosed the catalyst composition comprising i) Fe as main catalyst, ii) alumina and/or magnesia particle as catalyst support and iii) at least one optional co-catalyst selected from V, Nb, Ta, Cr, Mo, W, Mn, Tc, Re, Ru, Os, Co, Rh, Ir, Ni, Pd, Pt, or the lanthanides. However, it is hard to obtain a precise multi-walled carbon nanotube with a high catalytic yield using this catalyst composition, because the uniformed dispersion between metal catalyst and support material cannot be accomplished due to the use of alumina and/or magnesia support material.

In PCT publication No. WO 2007/33438, a catalyst system for multi-walled carbon nanotube production has been disclosed. In this disclosure, a catalyst system for the selective conversion of hydrocarbons into multi-walled carbon nanotubes and hydrogen comprising a compound of the formula: $(Ni, Co)Fe_yO_z(Al_2O_3)_w$ has been disclosed. Further, as preferred catalyst compositions, $CoFe_2O_4(Al_2O_3)_{4.5}$, $CoFe_2O_4 (Al_2O_3)_{16}$, and $CoFe_2O_4 (Al_2O_3)_{32}$ have been disclosed. Therefore, the catalyst composition comprising i) (Ni, Co) and Fe as main catalyst and ii) alumina as catalyst support has been disclosed. However, it is also hard to obtain a precise multi-walled carbon nanotube with a high catalytic yield using this catalyst composition, because the uniformed dispersion between metal catalyst and support material cannot be accomplished due to the use of alumina support material.

To overcome the low catalytic yield caused by non-uniformed dispersion of a catalyst composition, the inventors of present application have firstly disclosed a catalyst composition under U.S. Pat. No. 8,048,821 'Catalyst composition for the synthesis of thin multi-walled carbon nanotube and its manufacturing method'.

In this U.S. Pat. No. 8,048,821, a catalyst composition for producing carbon nanotube represented by following formula $[Fe_a:Al_b]_x:M_y:Mg_z$ has been disclosed. In this formula, Fe represents catalytic metal of iron, its oxide, or its derivative;

Al represents catalytic metal of aluminum, its oxide, or its derivative; Mg represents inactive support of magnesium, its oxide, or its derivative; and M represents at least one transition metal selected from Co, Ni, Cr, Mn, Mo, W, V, Sn, or Cu, its oxide or its derivative.

On the other hand, the inventors of present application have further disclosed a catalyst composition under U.S. Pat. Application publication No. US 2012/0077031 A1 'Catalyst composition for the synthesis of thin multi-walled carbon nanotube'.

In this U.S. Pat. Application publication No. US 2012/0077031 A1, a catalyst composition for producing carbon nanotube represented by following formula $[Co_a:Al_b]_x:M_y:Mg_z$ has been disclosed. In this formula, Co represents catalytic metal of cobalt, its oxide, or its derivative; Al represents catalytic metal of aluminum, its oxide, or its derivative; Mg represents inactive support of magnesium, its oxide, or its derivative; and M represents at least one transition metal selected from Ni, Cr, Mn, Mo, W, Pb, Ti, Sn, or Cu, its oxide, or its derivative.

Even though our previous catalyst composition represented by formula of $[Fe_a:Al_b]_x:M_y:Mg_z$ or $[Co_a:Al_b]_x:M_y:Mg_z$ has adopted Mg as inactive support, Mg cannot make a sufficient role of inactive support in case that Mg is mixed with other metal catalyst components. Therefore, our previous catalyst composition may have a handicap of synthesizing multi-walled carbon nanotubes having high density in a sufficiently high yield.

Therefore, the inventors of present application have developed novel catalyst composition by replacing the inactive support from Mg to Al, on condition that Fe and Mo have been adopted as main catalytic components. Further, since all catalytic components containing inactive support material in the present application have been prepared using spray-drying, spray pyrolysis, or co-precipitation process in the aqueous solution, the catalyst composition can be obtained as highly uniformed and dispersed fine powder form. Preferably, the catalyst composition would be better to be prepared using co-precipitation process in order to obtain the most uniformed and dispersed fine powder form.

Further, in the course of preparing a catalyst composition, a hydrogen reduction step has not been introduced.

Finally, the inventors of present application have developed a multi-component metal catalyst composition comprising i) main catalyst of Fe and Mo, ii) inactive support of Al and iii) optional co-catalyst at least one selected from Co, Ni, Ti, Mn, W, Sn, or Cu. Further, the present invention affords multi-walled carbon nanotube having 5~15 nm of fibrous diameter and 0.5~4 μm bundle diameter.

SUMMARY OF THE INVENTION

The object of present invention is to provide a catalyst composition for producing carbon nanotube represented by following formula.

$[Fe_a:Mo_b]_x:M_y:Al_z$ wherein

Fe, Mo represents catalyst active material of iron, molybdenum, its oxide, or its derivative; Al represents inactive support material of aluminum, its oxide, or its derivative; M represents at least one transition metal selected from Co, Ni, Ti, Mn, W, Sn, or Cu, its oxide, or its derivative.

x, y, and z represent molar fraction of [the sum of Fe and Mo], M and Al, x+y+z=10, 1.0≤x≤4.0, 0.1≤y≤3.0, 2.5≤z≤8.0;

a and b represent molar fraction of Fe and Mo, a+b=10, 7.9≤a≤9.9, 0.1≤b≤2.1.

Further, the molar fraction of [the sum of Fe and Mo], M, and Al is preferably x+y+z=10, 1.5≤x≤3.5, 0.3≤y≤2.5, 3.0≤z≤7.5;

a and b represent molar fraction of Fe and Mo, a+b=10, 7.7≤a≤9.7, 0.3≤b≤2.3.

Further, the molar fraction of [the sum of Fe and Mo], M, and Al is more preferably x+y+z=10, 2.0≤x≤3.0, 0.6≤y≤2.0, 3.5≤z≤7.0;

a and b represent molar fraction of Fe and Mo, a+b=10, 7.5≤a≤9.5, 0.5≤b≤2.5.

The other object of the present invention is to provide a process for preparing a catalyst composition for synthesizing carbon nanotube comprising i) dissolving multi-component metal salts for the metal catalyst composition $([Fe_a:Mo_b]_x:M_y:Al_z)$ comprising catalyst active metal (Fe and Mo), inactive support (Al) and transition metal (M) in water; ii) co-precipitating a multi-component catalyst composition by adding co-precipitating agent solution, spray-drying the solution containing the multi component metal salt, or spray pyrolysis of the solution containing the multi component metal salt; iii) filtering, drying, and milling the obtained co-precipitated catalyst composition; iv) calcinating the milled catalyst composition by thermal oxidation at 400~1,200° C.; and v) dried-milling and grinding the calcinated catalyst composition after thermal oxidation.

As metal salt, the form of nitrate, sulfate, acetate, alkoxide, carbonate, or chloride is preferred.

On the other hand, the further object of the present invention is to provide a process for preparing carbon nanotube having high apparent density comprising i) preparing a catalyst composition for the synthesis of carbon nanotube; ii) supplying mixed gas of hydrogen and at least one carbon source selected from saturated or unsaturated hydrocarbon having 1~4 carbon atoms to the reactor at 500~900° C.; and iii) growing and synthesizing carbon nanotube by thermal decomposition of supplied carbon source on the surface of a catalyst composition according to a thermal chemical vapor deposition method.

As reactor, vertical fixed-bed reactor, horizontal fixed-bed reactor, rotary kiln reactor, moving bed reactor, or fluidized bed reactor can be used.

According to the method for preparing carbon nanotube, multi-walled carbon nanotube having 5~15 nm of fibrous diameter and 0.5~4 μm bundle diameter can be prepared.

The further object of present invention is to provide a method for using multi-walled carbon nanotube as electrically conductive and strength enhanced fillers in polymer composite material, thermal conductive and strength enhanced fillers in metal composite, catalyst support of fuel cell, support material of organic process catalyst, storage material for methane and hydrogen gas, electrode material of lithium secondary battery, conductive material of lithium secondary battery, electrode material for high capacity electric double layer capacitor, field emitting material for display, and membrane material.

DETAILED DESCRIPTION OF THE INVENTION

Figure 1:
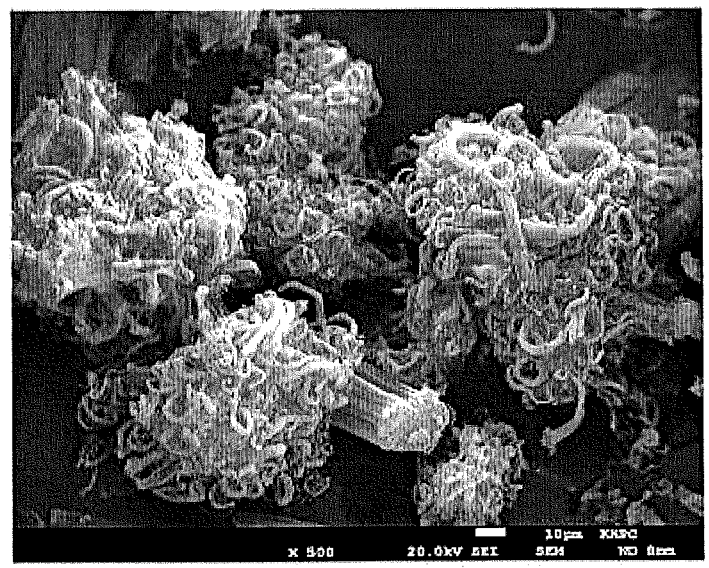
FIG. 1 shows a FE-SEM (Field Emission Scanning Electron Microscope) photograph of carbon nanotube prepared in Example 1 of present application.
Figure 2:
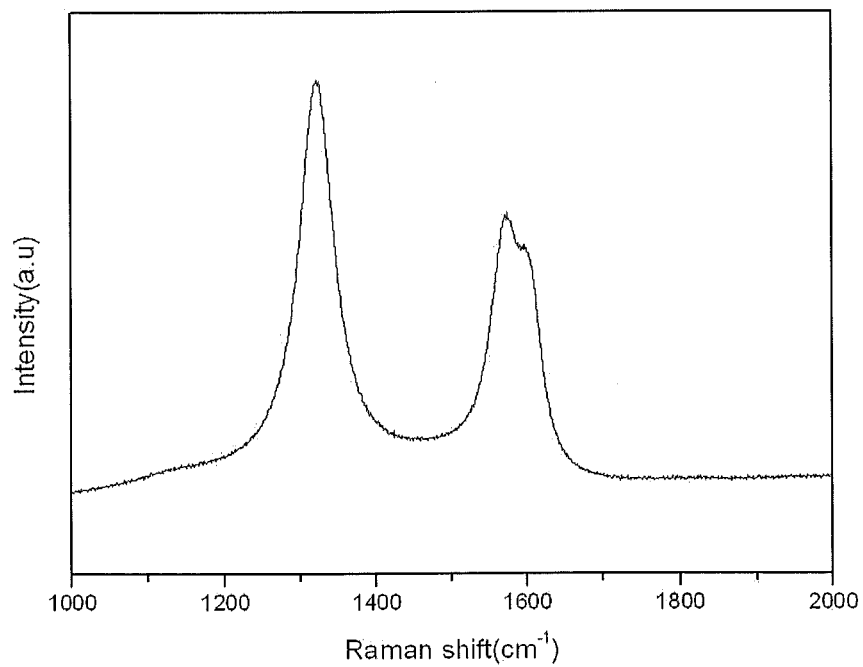
FIG. 2 shows a Raman graph of carbon nanotube prepared in Example 1 of present application.
Figure 3:
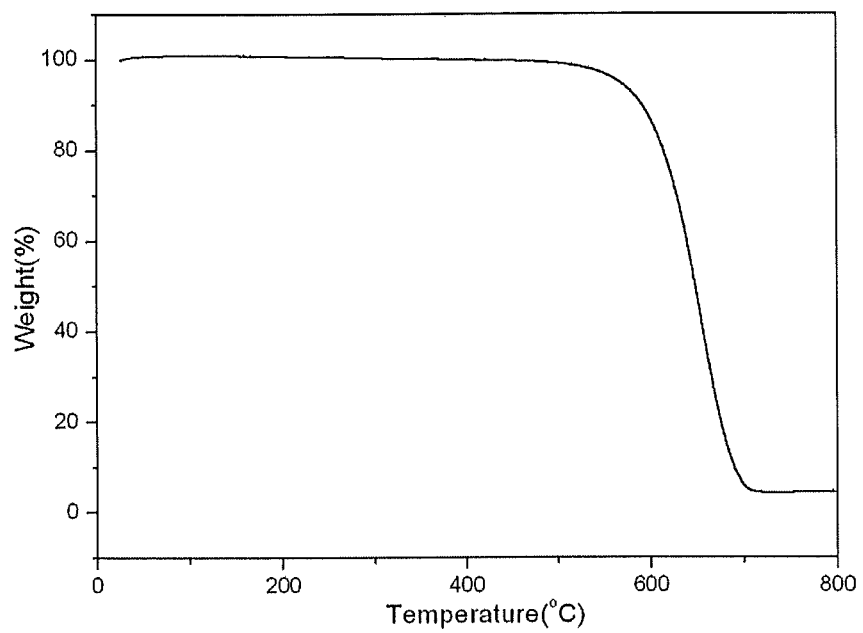
FIG. 3 shows a TGA (Thermogravimetric Analysis) graph of carbon nanotube prepared in Example 1 of present application.

Present invention relates to a catalyst composition for producing carbon nanotube represented by following formula.

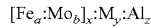

wherein

Fe, Mo represents catalyst active material of iron, molybdenum, its oxide, or its derivative; Al represents inactive support material of aluminum, its oxide, or its derivative;

M represents at least one transition metal selected from Co, Ni, Ti, Mn, W, Sn, or Cu, its oxide, or its derivative.

x, y, and z represent molar fraction of [the sum of Fe and Mo], M and Al, x+y+z=10, $1.0 \leq x \leq 4.0$, $0.1 \leq y \leq 3.0$, $2.5 \leq z \leq 8.0$;

a and b represent molar fraction of Fe and Mo, a+b=10, $7.9 \leq a \leq 9.9$, $0.1 \leq b \leq 2.1$.

Further, the molar fraction of [the sum of Fe and Mo], M, and Al is preferably x+y+z=10, $1.5 \leq x \leq 3.5$, $0.3 \leq y \leq 2.5$, $3.0 \leq z \leq 7.5$;

a and b represent molar fraction of Fe and Mo, a+b=10, $7.7 \leq a \leq 9.7$, $0.3 \leq b \leq 2.3$.

Further, the molar fraction of [the sum of Fe and Mo], M, and Al is more preferably x+y+z=10, $2.0 \leq x \leq 3.0$, $0.6 \leq y \leq 2.0$, $3.5 \leq z \leq 7.0$;

a and b represent molar fraction of Fe and Mo, a+b=10, $7.5 \leq a \leq 9.5$, $0.5 \leq b \leq 2.5$.

One of characteristics of the catalyst composition of present invention is to provide a uniformly dispersed catalyst composition comprising i) main catalyst of Fe and Mo, ii) inactive support of Al and iii) optional co-catalyst at least one selected from Co, Ni, Ti, Mn, W, Sn, or Cu. The catalyst composition can be prepared by i) co-precipitating a multi-component catalyst composition by adding co-precipitating agent solution, ii) spray-drying the solution containing the multi component metal salt, or iii) spray pyrolysis of the solution containing the multi component metal salt.

The other object of the present invention is to provide a process for preparing a catalyst composition for synthesizing carbon nanotube comprising i) dissolving multi-component metal salts for the catalyst composition ($[Fe_a:Mo_b]_x:M_y:Al_z$) in water; ii) co-precipitating a multi-component catalyst composition by adding co-precipitating agent solution, spray-drying the solution containing the multi component metal salt, or spray pyrolysis of the solution containing the multi component metal salt; iii) filtering and drying the obtained precipitated catalyst composition at 80~230° C. in the oven; iv) milling the dried catalyst composition; v) calcinating the milled catalyst composition by thermal oxidation at 400~1,200° C.; and vi) dried-grinding the calcinated catalyst composition after thermal oxidation.

As metal salt, the form of nitrate, sulfate, acetate, alkoxide, carbonate, or chloride is preferred. Nitrate can be preferably used as metal salt.

For the preparation of carbon nanotube, the calcinated catalyst composition can be placed in the vertical or horizontal fixed-bed quartz furnace. Then, saturated or unsaturated hydrocarbon gas having 1~4 carbon atoms is supplied at 500~900° C. Carbon nanotube can be prepared on the surface of catalyst in a high yield. Various kinds of reactor can be used for preparing carbon nanotube. For example, vertical fixed-bed reactor, horizontal fixed-bed reactor, rotary kiln reactor, mobile bed reactor, or fluidized bed reactor can be used.

In a preparation method of carbon nanotube, the supply of a catalyst composition and the recovery of carbon nanotube can be carried out in a continuous or discontinuous process. For the synthesis of carbon nanotube, carbon source gas, such as, methane, ethane, propane, butane, ethylene, propylene, butene, or butadiene has to be supplied. Of course, hydrogen gas or inert gas can be supplied together with carbon source gas. The reaction can be performed under the pressure of 0.1~2 bar as well as at the temperature of 500~900° C. However, the reaction conditions have to be controlled to make a deposition of carbon in an appropriate rate without auto-decomposition of gas phase hydrocarbon. The preferred reaction temperature is 500~800° C.

The form of calcinated powder is preferred. After finishing synthesis of carbon nanotube, catalyst component in the carbon nanotube can be removed by a physical or a chemical method. For this purpose, the obtained carbon nanotube can be treated with acid or base as well as heat treatment at high temperature.

According to the preparation method of present invention, carbon nanotube having 5~15 nm of diameter can be prepared in the 3~5 times higher yields than the conventional method. Further, additional removal of catalyst in the carbon nanotube may not be required, because the obtained carbon nanotube of present invention shows very low level of remaining catalyst components in the carbon nanotube. However, the obtained carbon nanotube can be physically or chemically treated for introducing a functional group to the surface of carbon nanotube or burning impure carbon materials.

The obtained carbon nanotube of present invention can be used as electrical conductive and strength enhanced fillers in polymer composite material, thermal conductive and strength enhanced fillers in metal composite, catalyst support of fuel cell, support material of organic process catalyst, storage material for methane and hydrogen gas, electrode material of lithium secondary battery, conductive material of lithium secondary battery, electrode material for high capacity electric double layer capacitor, field emitting material for display, and membrane material.

The outstanding advantageous effect of present invention is to provide a multi-walled carbon nanotube having 5~15 nm of fibrous diameter, 0.5~4 μm bundle diameter and 100~10,000 of aspect ratio in a high yield. Further, the catalyst composition of present invention comprising i) main catalyst of Fe and Mo, ii) inactive support of Al and iii) optional co-catalyst at least one selected from Co, Ni, Ti, Mn, W, Sn or Cu, thus enabling to prepare high purity multi-walled carbon nanotube in 3~5 times higher yields than the conventional method in a short period, such as, 30 minutes.

Further, the other outstanding advantageous effect of present invention is to provide a simple process for preparing a catalyst composition, wherein a hydrogen reduction step has not been introduced. Due to the simple preparation step of a catalyst composition and high catalytic yield of present invention, the production cost of carbon nanotube can be reduced. Further, the reduced cost for producing carbon nanotube affords that carbon nanotube can be applied in various fields in an economical manner.

The present invention can be explained more concretely by following Examples and Comparative Examples. However, the scope of the present invention shall not be limited by following Examples.

EXAMPLES

Example 1

Preparation of a Catalyst Composition with a Variation of the Molar Amount of Fe and Mo The carbon nanotube using catalyst composition consisting of Fe, Mo, and Al with Ni among metal M has been prepared. The molar ratio of Fe and Mo is changed from 10:0 to 0:10 wherein the molar ratio of Fe+Mo is fixed as 3, the molar ratio of M is fixed as 0.5, the molar ratio of Al is fixed as 6.5. After preparing a catalyst composition with a variation of the molar amount of Fe and Mo, carbon nanotubes have been prepared using these catalyst compositions. Catalytic yields have been measured for each of catalyst compositions.

The catalyst composition has been prepared as following methods. The solution containing a selected amount of $Fe(NO_3)_3 \cdot 9H_2O$, $(NH_4)_6Mo_7O_{24} \cdot 4H_2O$, $Al(NO_3)_3 \cdot 9H_2O$, and $Ni(NO_3)_2 \cdot 6H_2O$ in de-ionized water has been prepared. And then crystal form of catalyst composition is prepared by spray pyrolysis of the solution containing the multi component metal salt at 750° C.

Carbon nanotube has been prepared using the obtained catalyst composition in fixed bed reactor in an experimental scale. A selected amount of a catalyst composition has been placed at the mid part of quartz furnace reactor. The reactor has been heated to the desired temperature under nitrogen atmosphere. Mixed gas of ethylene and nitrogen gas in a volume ratio of 3:1 has been supplied and flowed for the synthesis of carbon nanotube. After 1 hour of synthesis, an amount of multi-walled carbon nanotube has been prepared.

The amount of carbon nanotube has been measured at room temperature. The structure and shape of carbon nanotube have been analyzed using FE-SEM analyses.

The catalytic yield has been measured by following equation. Catalytic yield=$100 \times (M_{total} - M_{cat})/(M_{cat})$, apparent density=the carbon nanotube weight (g) in container/volume of container (cc). Table 1 and Table 2 show the results of carbon nanotube synthesis using the catalyst composition prepared in Example 1.

As shown in Table 1, carbon nanotube can be prepared in a high yield when the range of molar ratio of Fe and Mo is within Fe $7.9 \leq a \leq 9.9$ and Mo $0.2 \leq b \leq 2.1$ in case of a+b=10.

TABLE 1

The synthesis of carbon nanotube using the catalyst composition prepared in Example 1.

| catalyst composition | Catalyst amount (mg) | Reaction temp. (° C.) | amount of reaction gas (mL/minutes) | Reaction time (minutes) | Catalytic yield (%) | Apparent density (g/cc) |
|---|---|---|---|---|---|---|
| [Fe:Mo]:Ni:Al = [9.86:0.14]:0.5:6.5 | 100 | 700 | $C_2H_4:N_2 = 30:13$ | 60 | 1,274 | 0.020 |
| [Fe:Mo]:Ni:Al = [9.58:0.42]:0.5:6.5 | | | | | 1,384 | 0.022 |
| [Fe:Mo]:Ni:Al = [9.28:0.72]:0.5:6.5 | | | | | 1,423 | 0.025 |
| [Fe:Mo]:Ni:Al = [8.97:1.03]:0.5:6.5 | | | | | 1,397 | 0.028 |
| [Fe:Mo]:Ni:Al = [8.65:1.35]:0.5:6.5 | | | | | 1,372 | 0.030 |
| [Fe:Mo]:Ni:Al = [8.31:1.69]:0.5:6.5 | | | | | 1,346 | 0.037 |
| [Fe:Mo]:Ni:Al = [7.96:2.04]:0.5:6.5 | | | | | 1,292 | 0.043 |

Remarks: The molar ratio of [Fe:Mo]:Ni:Al is constantly fixed as 3.0:0.5:6.5 in all catalyst compositions.

Comparative Example 1

Preparation of a Catalyst Composition with a Variation of the Molar Amount of Fe and Mo After preparing a catalyst composition with a variation of the molar amount of Fe and Mo, carbon nanotubes have been prepared using these catalyst compositions. Catalytic yields have been measured for each of catalyst compositions.

Other conditions for preparing a catalyst composition are same as those shown in Example 1. Further, the conditions for preparing carbon nanotube are also same as those shown in Example 1. Of course, a catalytic yield has been measured using the same manner in Example 1.

Table 2 shows the results of carbon nanotube synthesis using the catalyst composition prepared in Comparative Example 1. As shown in Table 2, when the range of molar ratio of Fe and Mo deviates from Fe $7.9 \leq a \leq 9.9$ and Mo $0.1 \leq b \leq 2.1$ in case of a+b=10, carbon nanotube cannot be prepared in a high yield, even though the apparent density of carbon nanotube increases.

Further, in the case that Mo is not included in a catalyst composition, that is, Fe:Ni:Al=3:0.5:6.5, the apparent density cannot be satisfied, even though catalytic yield of carbon nanotube is excellent. Therefore, not a little dust has been generated in the course of preparing carbon nanotube due to its low apparent density. As a conclusion, carbon nanotube having high apparent density cannot be prepared using only Fe as main catalytic metal, while carbon nanotube having high apparent density can be prepared in a high yield using Fe and Mo as main catalytic metals.

TABLE 2

The synthesis of carbon nanotube using the catalyst composition prepared in Comparative Example 1.

| Catalyst composition | Catalyst amount (mg) | Reaction temp. (° C.) | amount of reaction gas (mL/minutes) | Reaction time (minutes) | Catalytic yield (%) | Apparent density (g/cc) |
|---|---|---|---|---|---|---|
| [Fe:Mo]:Ni:Al = [10:0]:0.5:6.5 | 100 | 700 | $C_2H_4:N_2 = 30:13$ | 60 | 1,352 | 0.008 |
| [Fe:Mo]:Ni:Al = [4.31:5.69]:0.5:6.5 | | | | | 1,154 | 0.034 |
| [Fe:Mo]:Ni:Al = [3.16:7.84]:0.5:6.5 | | | | | 772 | 0.048 |
| [Fe:Mo]:Ni:Al = [1.86:8.14]:0.5:6.5 | | | | | 386 | 0.057 |
| [Fe:Mo]:Ni:Al = [0:10]:0.5:6.5 | | | | | 117 | 0.07 |

Remarks: The molar ratio of [Fe:Mo]:Ni:Al is constantly fixed as 3.0:0.5:6.5 in all catalyst compositions.

Example 2

Catalyst Compositions for Preparing Carbon Nanotube

A catalyst composition comprising Fe, Mo, Al and metal M has been prepared for the synthesis of carbon nanotube. The molar fraction of [Fe+Mo], M, and Al is 2:1:7 and the molar fraction of Fe and Mo is 9.28:0.72. Further, various kinds of transition metal (M) has been used for catalyst compositions. The catalytic yield for each catalyst composition has been measured after preparation of carbon nanotube.

The catalyst composition has been prepared as following methods. The solution dissolved with a selected amount of $Fe(NO_3)_3 \cdot 9H_2O$, $(NH_4)_6Mo_7O_{24} \cdot 4H_2O$, $Al(NO_3)_3 \cdot 9H_2O$ and one kind of metal salt selected from $Co(NO_3)_2 \cdot 6H_2O$, $Cu(NO_3)_2 \cdot 3H_2O$, $Mn(NO_3)_4 \cdot 4H_2O$, $(NH_4)_{10}W_{12}O_{40} \cdot 5H_2O$, $TiCl_3$, or $SnCl_4 \cdot 5H_2O$ in de-ionized water has been prepared. Then, crystal form of catalyst composition is prepared after spray pyrolysis of the solution containing the multi component metal salt at 750° C.

Carbon nanotube has been prepared using the obtained catalyst composition in fixed bed reactor in an experimental scale. A selected amount of a catalyst composition has been placed at the mid part of quartz furnace reactor. The reactor has been heated to the desired temperature under nitrogen atmosphere. Mixed gas of ethylene and nitrogen gas in a volume ratio of 3:1 has been supplied and flowed for the synthesis of carbon nanotube. After 1 hour of synthesis, an amount of multi-walled carbon nanotube has been prepared. The amount of carbon nanotube has been measured at room temperature. The structure and shape of carbon nanotube have been analyzed using FE-SEM analyses.

The catalytic yield has been measured by following equation. Catalytic yield=$100 \times (M_{total} - M_{cat})/(M_{cat})$, apparent density=the carbon nanotube weight (g) in container/volume of container (cc). Table 3 shows the results of carbon nanotube synthesis using the catalyst composition prepared in Example 2.

Even though a catalyst composition, comprising Fe, Mo, Al, metal M when satisfying the range of selected molar fraction ratio, shows high catalytic yield as shown in Example 1, the catalytic yield of present catalyst composition can be much enhanced when selected amount of M is added in the catalyst composition as shown in Table 3. Further, carbon nanotube having high apparent density can be prepared using the catalyst composition prepared in Example 2 in case that other carbon source, such as, propane can be used instead of ethylene

TABLE 3

The synthesis of carbon nanotube using the catalyst composition prepared in Example 2.

| catalyst composition | Catalyst amount (mg) | Reaction temp. (° C.) | amount of reaction gas (mL/minutes) | Reaction time (minutes) | Catalytic yield (%) | Apparent density (g/cc) |
|---|---|---|---|---|---|---|
| [Fe:Mo]:Ni:Al = [9.28:0.72]:1:7 | 100 | 700 | $C_2H_4:N_2 = 30:13$ | 60 | 1,542 | 0.025 |
| [Fe:Mo]:Co:Al = [9.28:0.72]:1:7 | | | | | 1,543 | 0.022 |
| [Fe:Mo]:Mn:Al = [9.28:0.72]:1:7 | | | | | 1,526 | 0.017 |
| [Fe:Mo]:Cu:Al = [9.28:0.72]:1:7 | | | | | 1,519 | 0.019 |
| [Fe:Mo]:W:Al = [9.28:0.72]:1:7 | | | | | 1,423 | 0.020 |
| [Fe:Mo]:Ti:Al = [9.28:0.72]:1:7 | | | | | 1,503 | 0.019 |

TABLE 3-continued

The synthesis of carbon nanotube using the catalyst composition prepared in Example 2.

| catalyst composition | Catalyst amount (mg) | Reaction temp. (° C.) | amount of reaction gas (mL/minutes) | Reaction time (minutes) | Catalytic yield (%) | Apparent density (g/cc) |
|---|---|---|---|---|---|---|
| [Fe:Mo]:Sn:Al = [9.28:0.72]:1:7 | | | | | 1,487 | 0.021 |

Remarks: The molar ratio of [Fe:Mo]:metal M:Al is constantly fixed as 2:1:7 in all catalyst compositions.

Comparative Example 2

Catalyst Compositions for Preparing Carbon Nanotube

Further, we have also prepared a catalyst composition that does not contain metal M component, or that contains an excess or a deficient amount of transition metal M in order to see the dependence of the catalytic yield on the amount of metal M.

Table 4 shows the results of carbon nanotube synthesis using the catalyst composition prepared in Comparative Example 2. As shown in Table 4, when the range of molar ratio of metal M deviates from $0.1 \leq y \leq 3.0$, carbon nanotube cannot be prepared in a high yield as well as a high apparent density.

Further, in the case that M is not included in a catalyst composition, that is, [Fe:Mo]:metal M:Al=3:0:7, both apparent density and high catalytic yield cannot be accomplished. As a conclusion, we estimate that metal M can be act as co-catalyst for enhancing both catalytic yield and apparent density of carbon nanotube.

TABLE 4

The synthesis of carbon nanotube using the catalyst composition prepared in Comparative Example 2.

| Catalyst composition | Catalyst amount (mg) | Reaction temp. (° C.) | amount of reaction gas (mL/minutes) | Reaction time (minutes) | Catalytic yield (%) | Apparent density (g/cc) |
|---|---|---|---|---|---|---|
| [Fe:Mo]:Ni:Al = [9.28:0.72]:5:3 | 100 | 700 | $C_2H_4:N_2 = 30:13$ | 60 | 1,063 | 0.048 |
| [Fe:Mo]:Ni:Al = [9.28:0.72]:4:4 | | | | | 1,147 | 0.037 |
| [Fe:Mo]:Ni:Al = [9.28:0.72]:0.05:7.95 | | | | | 1,162 | 0.012 |
| [Fe:Mo]:Ni:Al = [9.28:0.72]:0.025:7.975 | | | | | 959 | 0.01 |
| [Fe:Mo]:Al = [9.28:0.72]:8 | | | | | 845 | 0.009 |

What is claimed is:

1. A catalyst composition for producing carbon nanotube represented by the following formula:

$[Fe_a:Mo_b]_x:M_y:Al_z$ wherein
   Fe, Mo represents catalyst active material of iron, molybdenum, its oxide, or its derivative;
   Al represents inactive support material of aluminum, its oxide, or its derivative;
   M represents at least one transition metal selected from the group consisting of Co, Ni, Ti, Mn, W, Sn, Cu, and oxides, or derivatives thereof;
   x, y, and z represent molar fraction of [the sum of Fe and Mo], M and Al,
   $x+y+z=10$, $1.0 \leq x \leq 4.0$, $0.1 \leq y \leq 3.0$, $2.5 \leq z \leq 8.0$; and
   a and b represent molar fraction of Fe and Mo, $a+b=10$, $7.9 \leq a \leq 9.9$, $0.1 \leq b \leq 2.1$.

2. The catalyst composition for producing carbon nanotube according to claim 1, wherein the molar fraction of [the sum of Fe and Mo], M, and Al is $x+y+z=10$, $3.0z7.5$;
   a and b represent molar fraction of Fe and Mo,
   $a+b=10$, $7.7 \leq a \leq 9.7$, $0.3 \leq b \leq 2.3$.

3. The catalyst composition for producing carbon nanotube according to claim 2, wherein the molar fraction of [the sum of Fe and Mo], M, and Al is $x+y+z=10$, $2.0 \leq x \leq 3.0$, $0.6 \leq y \leq 2.0$, $3.5 \leq z \leq 7.0$;
   a and b represent molar fraction of Fe and Mo,
   $a+b=10$, $7.0 \leq a \leq 9.5$, $0.5 \leq b \leq 2.5$.

4. A process for preparing a catalyst composition for synthesizing carbon nanotube of claim 1 comprising:
   i) dissolving multi-component metal salts for the metal catalyst composition ($[Fe_a:Mo_b]_x:M_y:Al_z$) comprising catalyst active metal(Fe and Mo), inactive support(Al) and transition metal(M) in water;
   ii) co-precipitating a multi-component catalyst composition by adding co-precipitating agent solution, spray-drying the solution containing the multi-component metal salt, or spray pyrolysis of the solution containing the multi-component metal salt;
   iii) filtering, drying, and milling the obtained co-precipitated catalyst composition;
   iv) calcinating the milled catalyst composition by thermal oxidation at 400_1,200° C; and
   v) dried-milling and grinding the calcinated catalyst composition after thermal oxidation.

5. The process for preparing a catalyst composition for synthesizing carbon nanotube according to claim 4, wherein the multi-component metal salts are in the form of nitrate, sulfate, acetate, alkoxide, carbonate, or chloride.

* * * * *